Patented Apr. 30, 1940

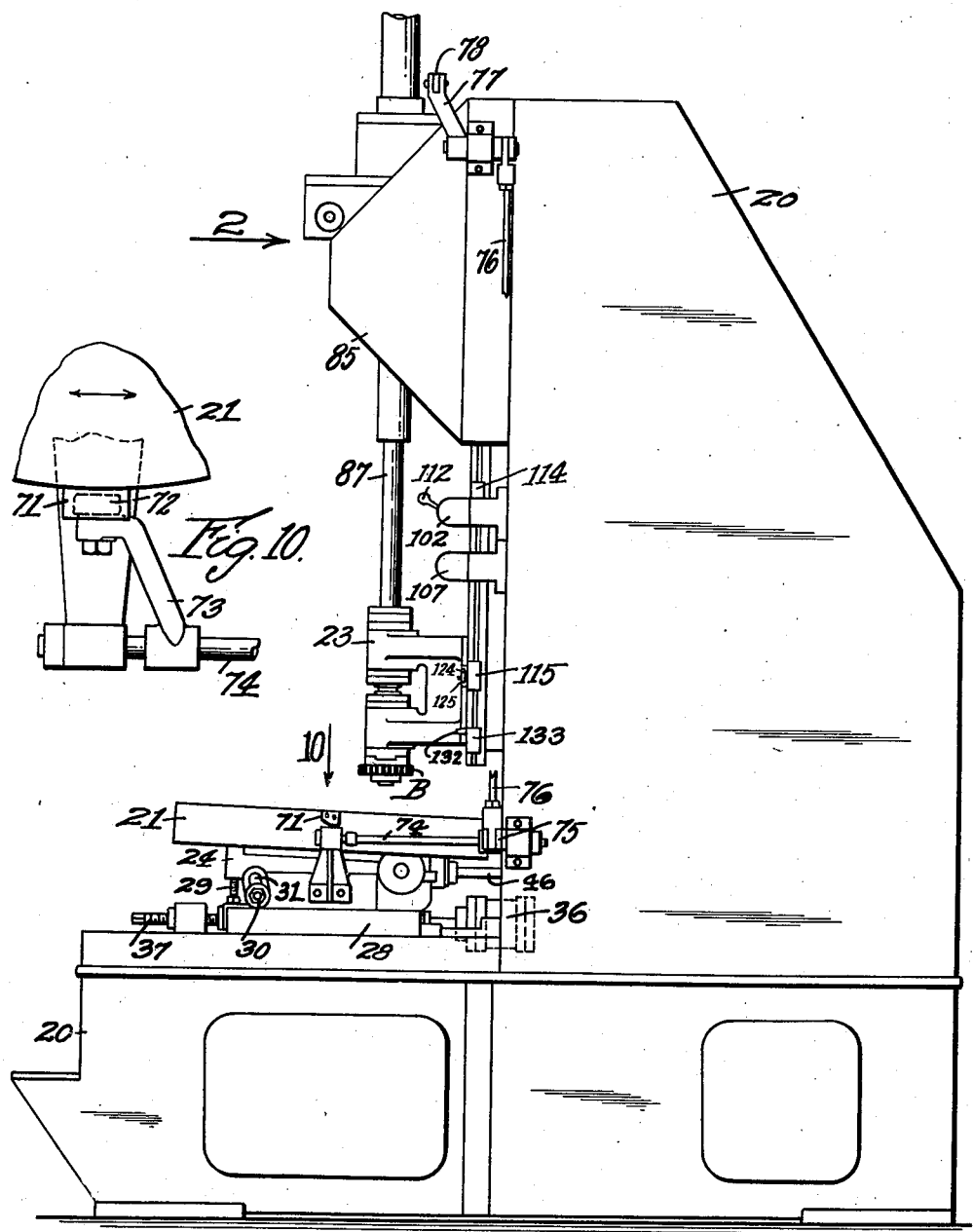

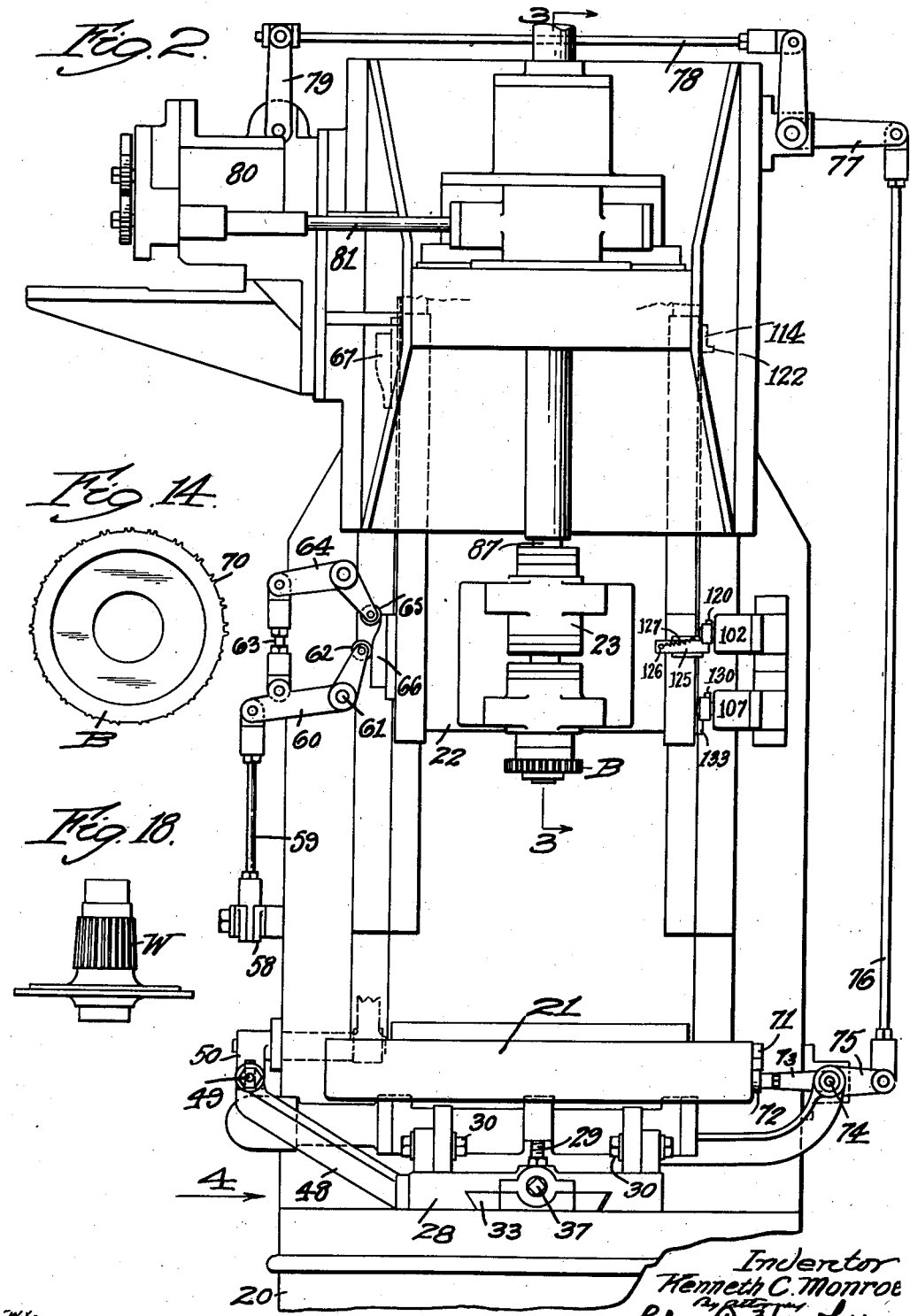

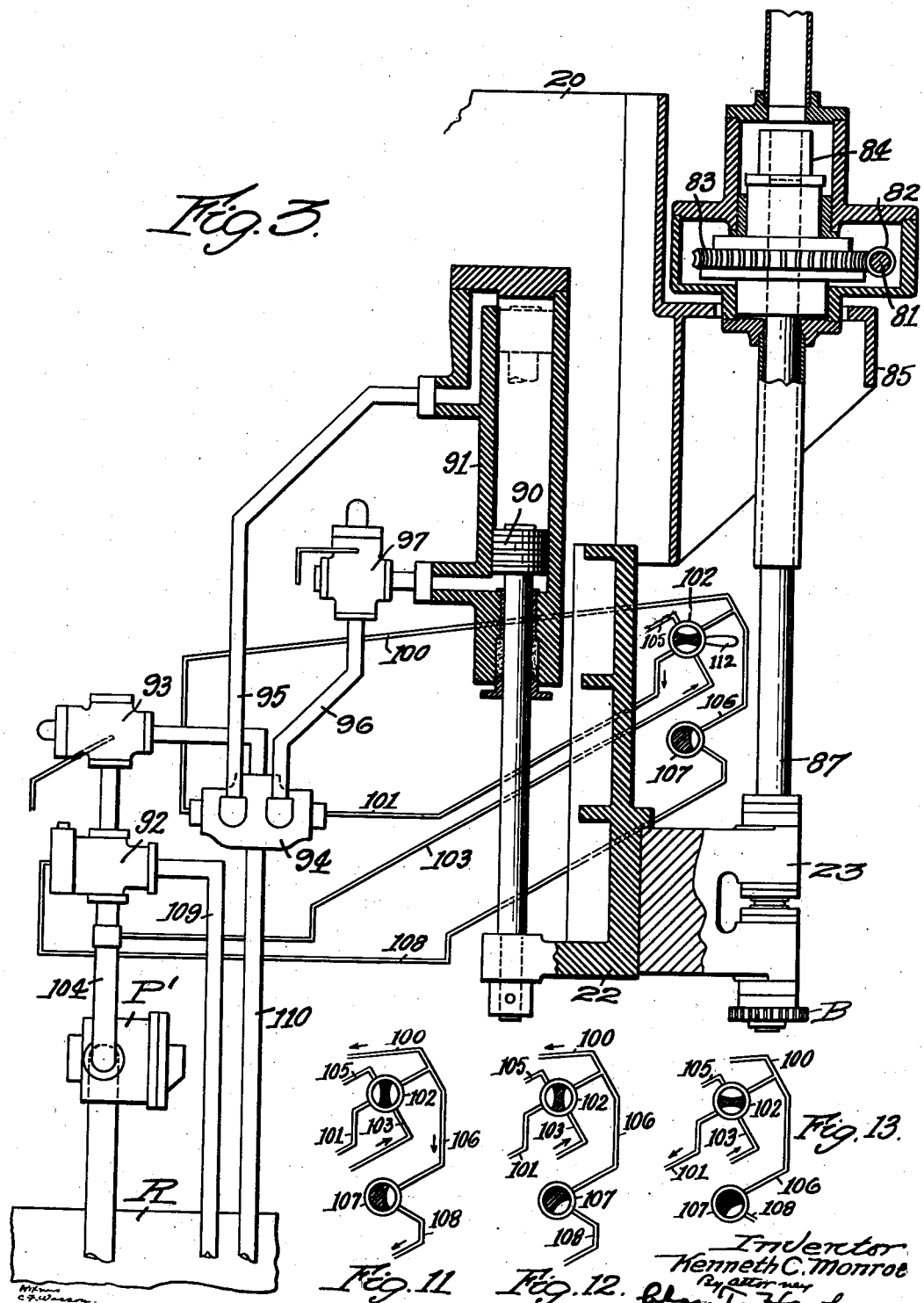

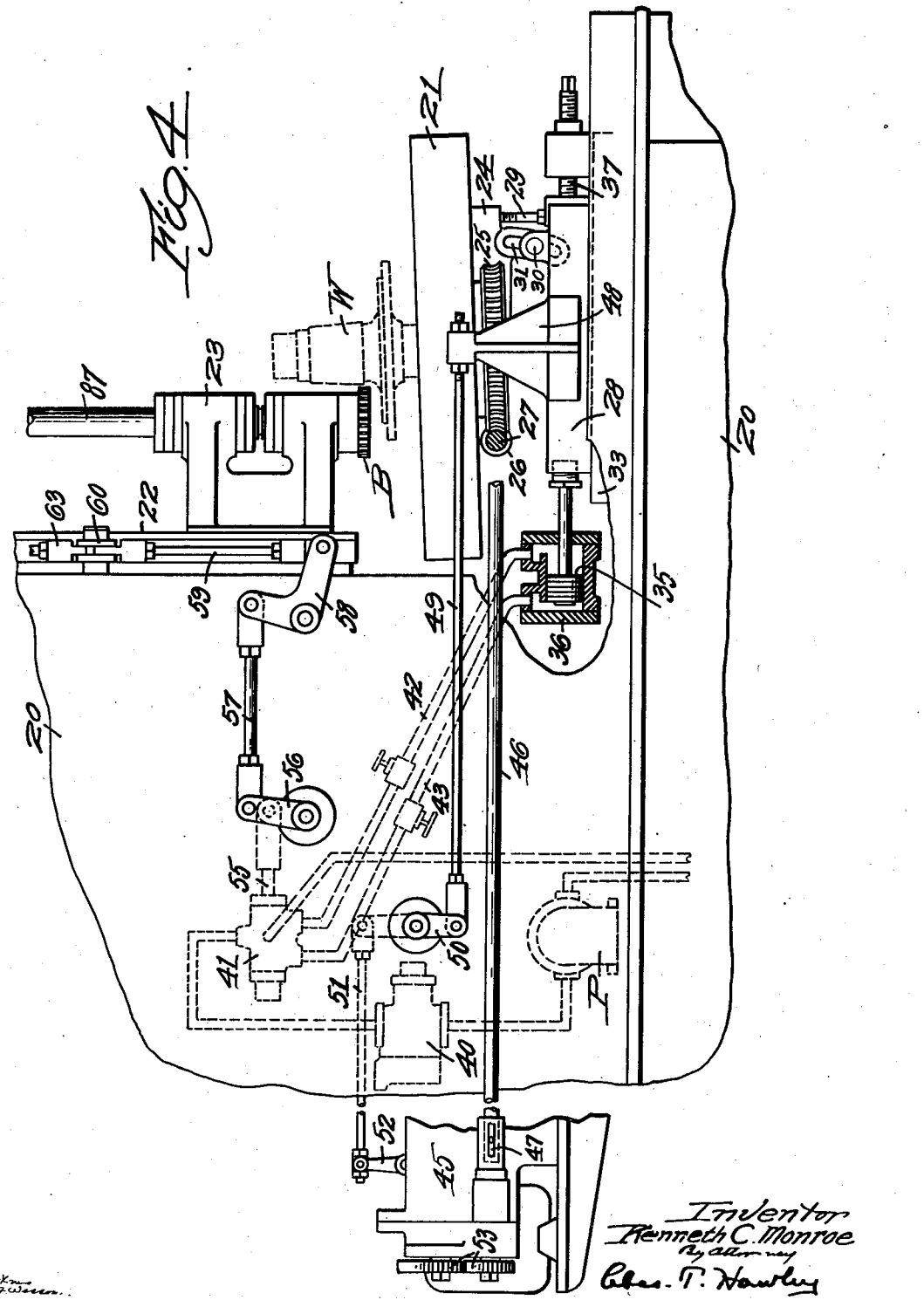

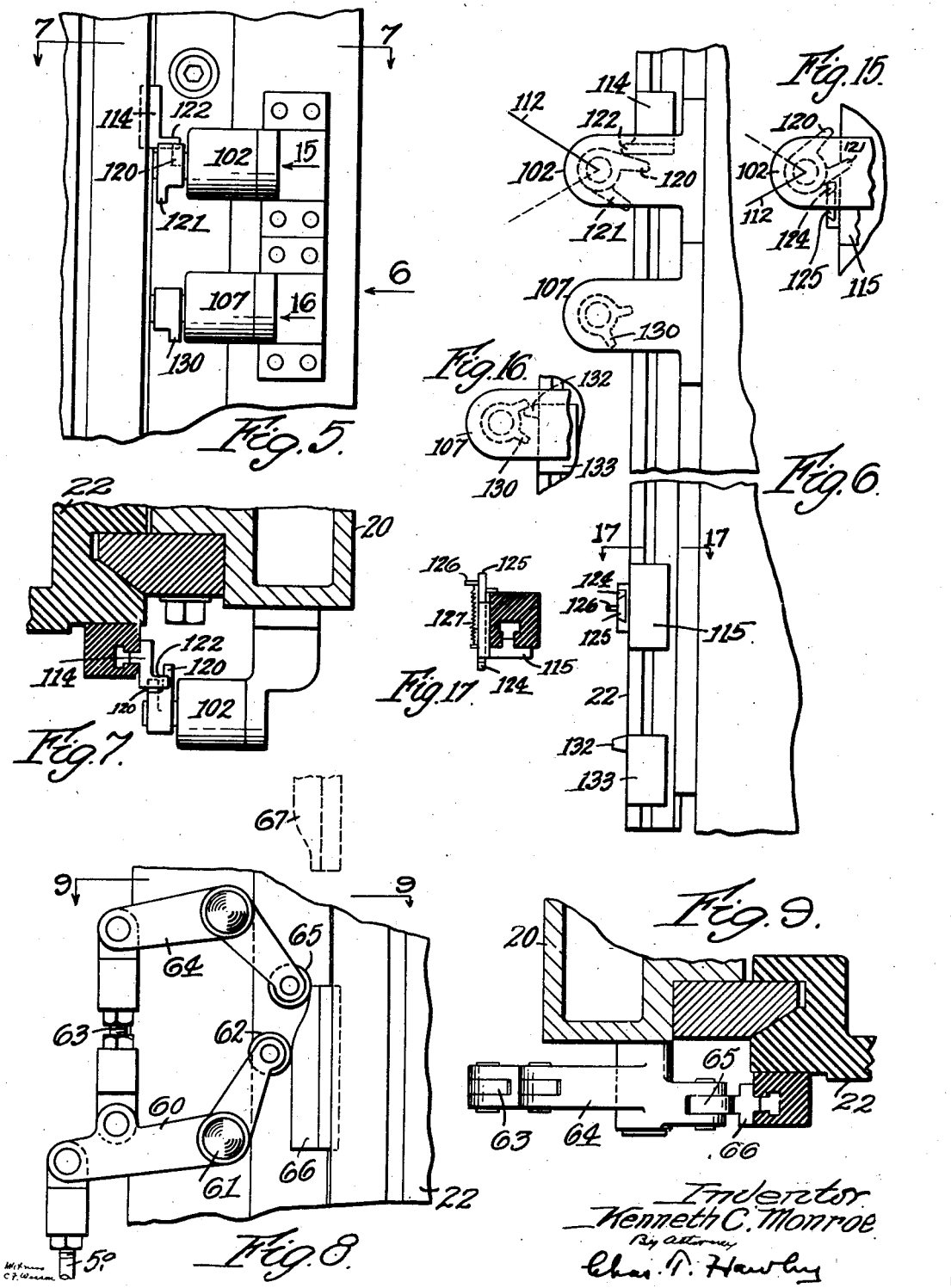

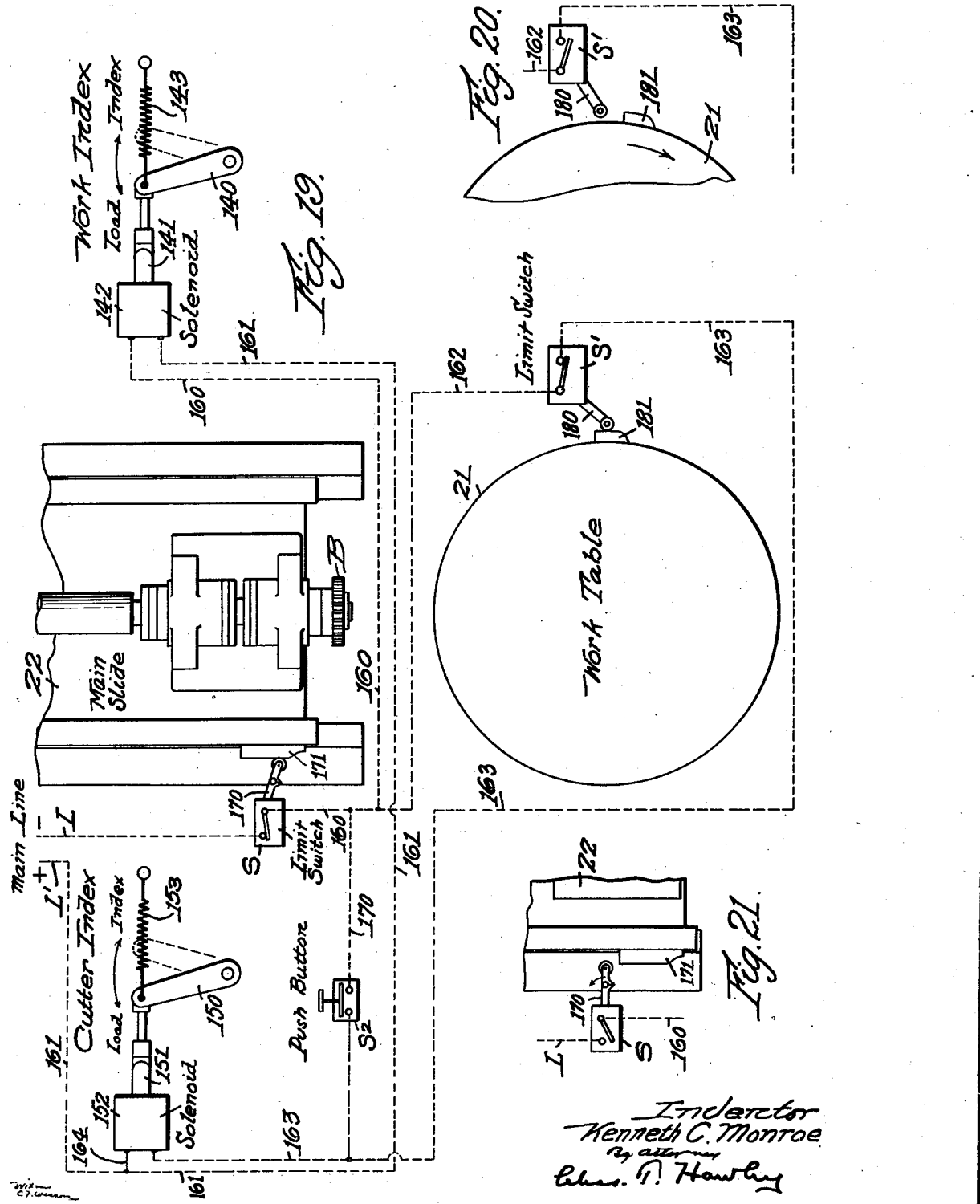

2,198,882

UNITED STATES PATENT OFFICE 2,198,882

MACHINE FOR BROACHING EXTERNAL SPLINES

Kenneth C. Monroe, Hudson, Mass., assignor to The Lapointe Machine Tool Company, Hudson, Mass., a corporation of Maine Application November 21, 1938, Serial No. 241,574

12 Claims. (Cl. 90—33)

This invention relates particularly to hydraulic broaching machines, although certain features of the invention are of more general application.

It is the general object of my invention to provide an improved broaching machine by which splines of uniform width may be broached on the external surface of a tapered hub or on other tapered structure of circular cross section.

To the attainment of this object, I provide a special type of circular broach, together with mechanism for indexing the work after each cutting stroke and mechanism for indexing the broach after each complete revolution of the work.

My invention includes automatic means for removing the work from broaching position during each indexing operation and for returning the work to broaching position before the next cutting stroke begins. I also provide improved hydraulic devices by which the machine may be automatically and manually controlled.

Another feature of my invention relates to the provision of an electric interlock controlling the timing and operation of the work table indexing and cutter indexing mechanisms.

My invention further relates to arrangements and combinations of parts which will be hereinafter described and more particularly pointed out in the appended claims.

A preferred form of the invention is shown in the drawings, in which

Fig. 1 is a side elevation of my improved broaching machine;

Fig. 2 is a partial enlarged front elevation;

Fig. 3 is a sectional side elevation, taken along the line 3—3 in Fig. 2 and with certain hydraulic connections shown diagrammatically;

Fig. 4 is a partial side elevation, showing mechanism for indexing the work table and looking in the direction of the arrow 4 in Fig. 2;

Fig. 5 is a partial front elevation, showing devices for controlling and reversing the broach travel;

Fig. 6 is a side elevation, looking in the direction of the arrow 6 in Fig. 5;

Fig. 7 is a sectional plan view, taken along the line 7—7 in Fig. 5;

Fig. 8 is an enlarged front elevation of devices for controlling the forward and rearward movements of the work table and fixture slide;

Fig. 9 is a sectional plan view, taken along the line 9—9 in Fig. 8;

Fig. 10 is a detail plan view, looking in the direction of the arrow in Fig. 1;

Figs. 11, 12 and 13 illustrate successive valve positions assumed in the operation of the machine;

Fig. 14 is a plan view of a special circular broach;

Figs. 15 and 16 are detail side views, looking in the directions of the arrow 15 and 16 in Fig. 4 respectively;

Fig. 17 is a detail sectional view, taken along the line 17—17 in Fig. 6;

Fig. 18 is a side elevation of a piece of work which my improved machine is well adapted to produce;

Fig. 19 is a diagrammatic view of certain electric interlock devices for timing and controlling the operation of the mechanisms for indexing the work table and cutter; and Figs. 20 and 21 are fragmentary views of certain parts appearing in Fig. 19 but shown in different operative positions.

Referring to the drawings, my improved broaching machine comprises a frame 20 supporting a work table 21 and a main slide 22 on which a broaching head 23 is mounted. The work table 21 is rotatably mounted on a hinged support 24 (Fig. 4) and is provided with a worm gear 25 meshing with a worm 26 on a worm shaft 27.

The worm shaft is supported in bearings in a fixture slide 28 and the support 24 is pivoted on the slide 28 to swing about the axis of the shaft 27. The angle of the table 21 relative to the support 24 may be adjusted by an elevating screw 29, and these parts may be clamped in adjusted position by bolts 30 extending through slots 31.

The fixture slide 28 is mounted in guideways 33 on the frame 20 and is moved forward and rearward by a piston 35 in the fixed cylinder 36. The forward position of the slide 28 is determined by a stop screw 37, and the rearward position may be similarly determined by an additional stop screw (not shown) or by adjustment of the piston 35 relative to the slide 28.

A constant delivery pump P is connected through a relief valve 40 to a reversing valve 41 which is connected by pipes 42 and 43 to the opposite ends of the cylinder 36. By shifting the valve 41, the connections between the pump P and the cylinder 36 may be reversed and the fixture slide 28 may be correspondingly moved forward or rearward.

In the operation of a machine, a piece of work W (Fig. 18) is mounted in axial alignment with the work table 21 and is rotated therewith to successive indexed positions relative to a circular broach B (Fig. 14). This broach comprises a series of cutting units uniformly spaced about its periphery and each unit having two cutting elements spaced apart by the width of the spline to be cut. The cutting elements in successive units are of increasing height, so that they make successively deeper cuts at the sides of the splines. In the usual operation of the machine, one cutting unit remains in fixed position during a complete but intermittent rotation of the work, after which the tool is indexed one space to bring the next cutting unit to cutting position. Neither the tool nor the work can be indexed except when these parts are radially separated. By the use of this type of broach, a spline of uniform width may be produced on tapered work.

The indexing is effected through an index mechanism 45 (Fig. 4) connected to the worm shaft 27 through a shaft 46 and through a pair of bevel gears, not shown but supported on the fixture slide 28. Sliding movement of the shaft 46 relative to the index mechanism 45 is permitted by a pin and slot connection 47. The index mechanism 45 is of a usual commercial form and the details thereon form no part of the present invention.

The index mechanism 45 is set in operation as the fixture slide 28 moves forward by control connections including a bracket 48 (Fig. 4), link 49, lever 50, link 51 and arm 52. Whenever the fixture slide 28 is moved forward by the piston 35, such movement, through the connections described, causes the index mechanism 45 to advance the work table 21 and work W angularly one space, the extent of which may be determined by adjustment of the index mechanism, as by changing gears 53 forming a part thereof.

The reversing valve 41 has its piston rod 55 (Fig. 4) connected through an arm 56, link 57 and bell crank 58 to the lower end of a link 59, the upper end of which is connected to a bent lever 60 (Fig. 2) pivoted at 61 and provided with a cam roll 62. The lever 60 is also connected by a link 63 to a second bent lever 64 having a cam roll 65. The rolls 62 and 65 are engaged by two-step cam blocks 66 and 67 as the main slide 22 is vertically reciprocated. The forward and rearward movements of the fixture slide 28 and work support 21 thus take place under control of the slide 22 and in timed relation to the reciprocation thereof.

The circular broach B is formed with a circumferential series of spaced cutting elements 70 (Fig. 14) and is intermittently advanced angularly or indexed to present successive pairs of cutting elements 70 in operative position. During the usual operation of the machine, the broach B remains fixed angularly while one pair of cutting elements makes a series of spaced cuts in the work W, with the work intermittently advanced after each cut.

After a full revolution of the work has been completed, a cam block 71 on the side of the work table 21 engages a cam roll 72 (Fig. 2) on an arm 73 mounted on a pivoted shaft 74 which is connected by an arm 75, link 76, bell crank 77, link 78, and arm 79 to a second index mechanism 80 adapted to intermittently advance an index shaft 81 angularly. This index mechanism is commercial and is commonly identical with the index mechanism 45 and the details thereof form no part of the present invention. The shaft 81 (Fig. 3) is connected through a worm 82 and worm gear 83 to a bushing 84 mounted in bearings supported on a bracket 85 fixed to the frame 20.

A shaft 87 is mounted in bearings in the broaching head 23, which head is secured to the main slide 22. The shaft 87 is keyed or splined in the bushing 84 so that it will be turned thereby but is freely slidable axially relative thereto.

The main slide 22 (Fig. 3) is connected to a piston 90 slidable in a cylinder 91 mounted in fixed position in the frame 20. A constant delivery pump P' is connected through a by-pass valve 92 and a reducing valve 93 to a reversing valve 94 which in turn is connected through pipes 95 and 96 to the upper and lower ends of the cylinder 91 respectively. A back pressure and check valve 97 is provided in the connection 96.

The reversing valve 94 is operated through hydraulic connections 100 and 101, extending from the opposite ends of the valve 94 to a pilot valve 102, which in turn is connected through a pipe 103 to the delivery pipe 104 of the pump P'. A vent pipe 105 connects the valve 102 to the reservoir R.

A branch pipe 106 connects the pipe 100 to a stopping valve 107, which in turn is connected through a pipe 108 to the by-pass valve 92. The construction of the valve 92 is such that when the pipe 108 is closed, as shown in Figs. 11 and 12, pressure will be built up in the left-hand end of the valve 92 and the by-pass will be closed. If, on the other hand, the pipe 108 is vented or open to atmosphere, the by-pass of the valve 92 will open, and the oil supplied by the pump P' will be returned to the reservoir R through the return pipe 109. The oil discharged from the cylinder 91 is returned to the reservoir R through a pipe 110. The operation of the hydraulic mechanism thus described will be hereinafter explained.

The pilot valve 102 is provided with a handle 112 for manual operation of the valve in setting up the machine and in starting the machine after a new piece of work has been inserted. The valve 102 is also controlled automatically by upper and lower trip dogs 114 and 115. The movable element of the valve 102 is provided with lugs 120 and 121 which are axially offset, as shown in Figs. 2 and 5, so that the lug 120 is in alignment with a projection 122 on the upper dog 114, and the lug 121 is in alignment with a projection 124 (Fig. 17) on a transversely movable slide 125 forming part of the lower dog 115.

This slide 125 may be withdrawn manually by pressure on a stud 126 mounted on the slide and effective to move the slide to the left in Fig. 2 against the pressure of a spring 127. Whenever the slide is released, it returns to normal operative position, with the projection 124 in alignment with the lug 121.

The rotatable element of the stop valve 107 has a forked projecting member 130 (Figs. 5 and 16), out of alignment with the lug 121 of the valve 102 and engageable by a projection 132 on a stop dog 133. The dogs 114, 115 and 133 are all mounted on the main slide 22 and may be separately adjusted vertically and secured in any desired relative position, so that any desired length of stroke may be attained.

Having described the details of construction of my improved broaching machine, the method of operation is as follows:

The valves 102 and 107 are shown in Fig. 3 in the stopped position in which the pipe 108 is vented through the valve 107, pipe 106, valve 102 and return pipe 105. This venting of the pipe 108, as previously explained, by-passes the discharge of the pump P' through the return pipe 109, so that no substantial pressure can be built up in the operating system and all parts remain at rest. Under these conditions, the back pressure valve 97 maintains sufficient pressure in the lower part of the cylinder 91 to hold the piston 90 and connected parts in raised position.

To start the machine, the operator uses the handle 112 to shift the valve 102 from the position shown in Fig. 3 to the position shown in Fig. 11. This connects the vent pipe 108 through the valve 102 to the pressure pipe 103, whereupon the by-pass valve 92 closes and pressure is built up in the operating system.

The pressure pipe 103 is at the same time connected through the valve 102 and through the pipe 100 to the left-hand end of the reversing valve 94 and shifts the valve so that the pump is connected to apply pressure through the pipe 95 to the upper end of the cylinder 91.

As soon as the main slide 22 starts downward, the projection 132 on the stop dog 133 (Fig. 16) acts through the lower arm of the fork 130 to shift the valve 107 to the position shown in Fig. 12, closing the vent pipe 108. The valves 102 and 107 remain in this position during the downward or broaching stroke.

At the lower end of the broaching stroke, the lug 122 of the upper dog 114 engaged and shifts the valve 102 to the position shown in Fig. 13, which corresponds to the position of said valve in the stopped relation of Fig. 3. The stop valve 107 is, however, now in a different position, so that the pump P' is not by-passed and pressure in the pipe 103 is exerted through the pipe 101 on the right-hand end of the reversing valve 94, thus reversing the travel of the piston 90 and slide 22.

Such automatic reversal of travel at both the upper and lower ends of the movements of the slide 22 will continue indefinitely or until the operator desires to stop the machine. In that event, he moves the projection 124 (Figs. 2 and 17) out of the alignment with the lug 121 of the valve 102. This renders the lower dog 115 inoperative and shifts the control to the stop dog 133, which on slight further upward travel of the slide 22 engages and shifts the stop valve 107 to bring the machine to rest with the piston in extreme raised position and all parts in the initial position shown in Fig. 3.

It will be noted that it is not thereafter necessary to return the stop valve manually to running position, as this result takes place automatically as soon as the next downward movement of the slide begins.

The machine is particularly designed for the broaching of a plurality of splines of uniform cross section on an external conical surface, such as a hub of a gear or wheel. When used for this purpose and with a circular broach B of the general type shown in Fig. 14, the broach is regularly reciprocated vertically with the shaft 87 and slide 22, and the work W is shifted forward and away from the broach after each broaching cut. The work is then indexed while in forward position and while the broach is returning to raised position.

The broach then makes a cut at the next spline position and this operation is continued until a full revolution of the work has been completed, whereupon the cam plate 71 on the work table renders the broach indexing mechanism operative to advance the broach one space angularly while the work is being indexed to initial position.

This series of operations is continued until the last pair of cutting elements on the broach B have made their finish cut, whereupon the operator stops the machine by withdrawing the projection 124 as previously described, after which the finished work is removed and replaced by a new blank.

The machine is thus fully automatic and requires no attention from the operator except to remove finished work and insert new blanks. The broaching operation is performed with extreme accuracy and the splines are of uniform cross section throughout their length and are equally spaced, so that they will fit with extreme accuracy in a part which has been internally broached by a somewhat similar operation to provide inclined keyways of corresponding and uniform cross section.

The machine operates smoothly and rapidly and involves no manual effort in its control by the operator, who merely shifts the pilot valve 102 to start the machine and withdraws the dog 115 to stop the machine.

It should be particularly noted that all movements are so timed that the indexing of the work and broach is performed during the return stroke of the broach but while the work is out of engagement therewith and thus with no loss of time.

In the modification of my invention disclosed in Figs. 19, 20 and 21, I have substituted an electric interlock control for the index mechanisms 45 and 80, in place of the direct mechanical control best shown in Figs. 2 and 4 and previously described.

An arm 140 (Fig. 19), corresponding to the arm 52 (Fig. 4) on the work table indexing mechanism 45, is connected to a plunger 141 slidable in a solenoid 142 and is also connected to a relatively heavy spring 143 tending to move the arm 140 in a clockwise direction as viewed in Fig. 19, thereby starting the indexing mechanism. When the solenoid 142 is energized, the arm 140 is swung to the left or "loaded," and when the solenoid circuit is broken, the spring 143 moves the arm 140 to the right and the indexing mechanism operates forthwith.

A similar arm 150 (Fig. 19), corresponding to the arm 79 (Fig. 2) associated with the cutter indexing mechanism 80, is connected to a plunger 151 slidable in a solenoid 152 and is also connected to a spring 153 which moves the arm 150 to the right when released and thereby initiates operation of the cutter indexing mechanism.

A line wire L is connected to one pole of a normally open limit switch S, and the other pole of the switch S is connected through a wire 160 to the solenoid 142, which in turn is connected through a return wire 161 to the second line wire L'.

Another normally open limit switch S' is connected by a wire 162 to the wire 160 previously described, and is also connected by a wire 163 to the solenoid 152, which in turn is connected by a wire 164 to the return wire 161. With these connections, it will be evident that the solenoid 152 is energized only when both switches S and S' are closed.

A branch wire 170 connects the wire 160 to the wire 163 and is provided with a hand-operated or push-button switch S² which may be closed to index the cutter at any time when the switch S is closed and without dependence on the closing of the switch S'.

The switch S is provided with a two-piece operating arm 170 engaged by a cam block 171 adjustably mounted on the main slide 22. This cam block 171 may be either identical with or additional to the cam block 66 which actuates the devices shown in Figs. 2 and 4 which control the forward and rearward movement of the work table 22.

The two-part arm 170 is so constructed that the switch S will open as the arm 170 drops off of the rear or upper end of the cam block 171, and also that the arm 171 will yield without closing the switch S as the cam block thereafter moves upward.

The limit switch S' is closed by an arm 180 when the arm is engaged by a cam block 181 on the side of the work table 21, corresponding to the cam block 171 previously described. The normal or open positions of the switches S and S' are indicated in Figs. 21 and 20 respectively.

Each time the main slide 22 approaches its lower limit of travel, the cam block 171 engages the arm 170 and closes the switch S as shown in Fig. 19, thus energizing the solenoid 142 and withdrawing or loading the arm 140 which controls the work table indexing mechanism. As the cam block 171 approaches the position shown in Fig. 21, the arm 170 snaps off of the upper end of the cam block and the switch S opens, breaking the solenoid circuit and releasing the arm 140 which then starts the work table indexing mechanism 45 in operation.

The work table will thus be indexed or advanced one space as soon as the broaching cutter B has passed through that portion of the work W (Fig. 18) which is to be splined. This indexing is performed a little more promptly than in the previous construction, in which the indexing mechanism for the work table was controlled by the forward movement of the work table relative to the main slide.

When a revolution of the work table has been completed, the cam block 181 will engage and close the limit switch S' as indicated in Fig. 19. On the next subsequent descent of the main slide 22 and closure of the switch S, both solenoids 142 and 152 will be energized, and on the opening of the switch S, both solenoids will be released and both indexing mechanisms 45 and 80 will become simultaneously operative.

If it is at any time desired to index the cutter manually without waiting for completion of a revolution of the work table, this may be accomplished by closing the push button switch S² and holding the switch closed until the limit switch S is thereafter closed. It will be noted, however, that the manual switch S² is under the control of the limit switch S, so that the cutter cannot be indexed even manually except when the downward movement of the main slide 22 has been substantially completed and the cutter is free from the work. Both cutter and work are thus safeguarded.

Having thus described my invention and the advantages thereof, I do not wish to be limited to the details herein disclosed, otherwise than as set forth in the claims, but what I claim is:

1. In a hydraulic broaching machine, in combination, a rotatable work table, a circular broach having successive broaching units circumferentially arranged and of progressively increased length and each unit having two spaced cutting elements, a rotatable shaft on which said broach is mounted, means to reciprocate said shaft and broach, means to radially separate the work and broach after each broaching stroke, automatic means to index the work table after each broaching stroke and radial separation while the work is out of contact with the broach, and automatic means to index the broach to advance the next broaching unit to broaching position after the work table has been intermittently advanced a complete revolution and while the work and broach are separated.

2. In a hydraulic broaching machine, in combination, a rotatable work table, a circular broach having successive broaching units circumferentially arranged and of progressively increased length and each unit having two spaced cutting elements, a rotatable shaft on which said broach is mounted, means to reciprocate said shaft and broach, means to radially separate the work and broach after each broaching stroke, an automatic index device for said work table and work, a second automatic index device for said shaft and broach, means to render said first index device operative at the end of each broaching stroke and radial separation and while the work is out of contact with the broach, and means to render said second index device operative to advance the next broaching unit to broaching position after said work table has been indexed through a complete revolution.

3. In a hydraulic broaching machine, in combination, a rotatable work table, a circular broach having successive broaching units circumferentially arranged and of progressively increased length and each unit having two spaced cutting elements, a rotatable shaft on which said broach is mounted, means to reciprocate said shaft and broach, means to radially separate the work and broach after each broaching stroke, an automatic index device for said work table and work, a second automatic index device for said shaft and broach, means to render said first index device operative at the end of each broaching stroke and radial separation and while the work is out of contact with the broach, control means for said second index device, and a member on the work table engaging said control means and rendering said means operative once only in each revolution of said work table.

4. In a hydraulic broaching machine, in combination, a rotatable work table, a circular broach having successive broaching units circumferentially arranged and of progressively increased length and each having two spaced cutting elements, a rotatable shaft on which said broach is mounted, means to reciprocate said shaft and broach, means to radially separate the work and broach after each broaching stroke, an automatic index device for said work table, a second automatic index device for said shaft and broach, electrically controlled means to render said first index device operative at the end of each broaching stroke and radial separation and while the work is out of contact with the broach, and electrically controlled means to render said second index device operative after said work table has been indexed through a complete revolution.

5. In a hydraulic broaching machine, in combination, a rotatable work table, a circular broach having successive broaching units circumferentially arranged and each having two spaced cutting elements, a rotatable shaft on which said broach is mounted, means to reciprocate said shaft and broach, means to radially separate the work and broach after each broaching stroke, an automatic index device for said work table, a second automatic index device for said shaft and broach, electrically controlled means to render said first index device operative at the end of each broaching stroke and radial separation and while the work is out of contact with the broach, and electrically controlled means to render said second index device operative after said work table has been indexed through a complete revolution and when said broach and work are radially separated.

6. In a hydraulic broaching machine, in combination, a rotatable work table, a circular broach having successive broaching units circumferentially arranged and each having two spaced cutting elements, a rotatable shaft on which said broach is mounted, means to reciprocate said shaft and broach, means to radially separate the work and broach after each broaching stroke, an automatic index device for said work table, a second automatic index device for said shaft and broach, electrically controlled means to render said first index device operative at the end of each broaching stroke and radial separation and while the work is out of contact with the broach, electrically controlled means to render said second index device operative after said work table has been indexed through a complete revolution, and said two electrically controlled means being electrically interlocked to operate in predetermined sequence only.

7. In a hydraulic broaching machine, in combination, a rotatable work table, a circular broach having successive broaching units circumferentially arranged and each having two spaced cutting elements, a rotatable shaft on which said broach is mounted, means to reciprocate said shaft and broach, means to radially separate the work and broach after each broaching stroke, an automatic index device for said work table, a second automatic index device for said shaft and broach, electrically controlled means to render said first index device operative at the end of each broaching stroke and radial separation and while the work is out of contact with the broach, electrically controlled means to render said second index device operative after said work table has been indexed through a complete revolution, said two electrically controlled means being electrically interlocked to operate in predetermined sequence only, and additional manually controlled means to render said second index device operative but only when said broach and work are radially separated.

8. In a hydraulic broaching machine, a constant delivery pump, a broach head and slide actuated thereby, a pilot valve by which the travel of said slide is controlled, dogs on said slide which automatically reverse said pilot valve at each end of the slide travel, means to by-pass the pump, and an additional dog on said slide effective to open said by-pass means on overrun of the slide beyond its normal starting position.

9. In a hydraulic broaching machine having a broaching slide and having hydraulic mechanism to actuate said slide which includes a constant delivery pump and a reversing valve, in combination, a pilot valve for said reversing valve, upper and lower dogs on said slide controlling said pilot valve, a by-pass valve for said pump, a stop valve operative to cause said by-pass valve to open, and additional means on said slide operative to shift said stop valve to open the by-pass valve and stop the slide when the lower dog which normally reverses the slide movement at the end of the upward return stroke is out of operative position.

10. In a hydraulic broaching machine having a broaching slide and having hydraulic mechanism to actuate said slide which includes a constant delivery pump and a reversing valve, in combination, a pilot valve for said reversing valve, upper and lower dogs on said slide controlling said pilot valve, a by-pass valve for said pump, a stop valve operative to cause said by-pass valve to open, and a third dog for said stop valve, said third dog engaging said stop valve only when the lower pilot valve dog has been manually disabled and the slide has overrun upward, said third dog also restoring said stop valve to normal position as the next downward movement of said slide begins.

11. In a hydraulic broaching machine having a broaching slide and having hydraulic mechanism to actuate said slide which includes a constant delivery pump and a reversing valve, in combination, a pilot valve for said reversing valve, a by-pass valve for said pump, a vent pipe controlling said by-pass valve, a stop valve to open and close said vent pipe, and devices on said slide effective to automatically shift said pilot valve during normal slide reciprocation and to move said stop valve to open said vent pipe during upward overrun of said slide.

12. In a hydraulic broaching machine having a broaching slide and having hydraulic mechanism to actuate said slide which includes a constant delivery pump and a reversing valve, in combination, a pilot valve for said reversing valve, a by-pass valve for said pump, a vent pipe controlling said by-pass valve, a stop valve to open and close said vent pipe, and devices on said slide effective to automatically shift said pilot valve during normal slide reciprocation and to move said stop valve to open said vent pipe during upward overrun of said slide, said pilot valve and said stop valve being located in series with respect to said vent pipe.

KENNETH C. MONROE.